(12) United States Patent
Kurosawa (10) Patent No.: US 7,140,788 B2
(45) Date of Patent: Nov. 28, 2006

(54) CAMERA BODY

(75) Inventor: Yuichi Kurosawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 77 days.

(21) Appl. No.: 10/900,136

(22) Filed: Jul. 28, 2004

(65) Prior Publication Data

US 2005/0025475 A1    Feb. 3, 2005

(30) Foreign Application Priority Data

Jul. 29, 2003   (JP)   ............... 2003-281569

(51) Int. Cl.
G03B 17/02   (2006.01)
G03B 19/12   (2006.01)

(52) U.S. Cl. ............ 396/354; 396/535; 348/373

(58) Field of Classification Search ........ 396/354–359, 396/535, 541

See application file for complete search history.

(56) References Cited

U.S. PATENT DOCUMENTS

| 4,279,494 | A |   | 7/1981  | Yoshikawa et al. ......... 396/535 |
| 4,417,796 | A |   | 11/1983 | Sugiura et al. ............ 396/357 |
| 4,953,029 | A | * | 8/1990  | Morimoto et al. ............ 348/64 |
| 5,034,824 | A |   | 7/1991  | Morisawa et al. ........... 386/118 |
| 5,067,808 | A |   | 11/1991 | Alscher ..................... 352/140 |
| 5,510,973 | A |   | 4/1996  | Morioka ........................ 700/5 |
| 5,570,231 | A |   | 10/1996 | Mogamiya .................. 359/640 |
| 5,659,825 | A | * | 8/1997  | Dobashi ..................... 396/357 |
| 6,035,147 | A |   | 3/2000  | Kurosawa .................... 396/429 |
| 6,036,378 | A | * | 3/2000  | Murakami et al. ......... 396/486 |
| 6,665,016 | B1|   | 12/2003 | Saitoh ........................ 348/374 |
| 2001/0010562 | A1 |   | 8/2001 | Nakagashi et al. ......... 348/374 |
| 2003/0043294 | A1 |   | 3/2003 | Saitoh ........................ 348/375 |
| 2003/0197786 | A1 |   | 10/2003 | Hirunuma et al. ..... 348/207.99 |

FOREIGN PATENT DOCUMENTS

DE   3146254   5/1983
JP   200369886  3/2003

OTHER PUBLICATIONS

U.S. Appl. No. 10-900,136, to Kurosawa, which was filed on Jul. 28, 2004.
U.S. Appl. No. 10/900,142, to Kurosawa, which was filed on Jul. 28, 2004.
U.S. Appl. No. 10/900,322, to Kurosawa, which was filed on Jul. 28, 2004.

* cited by examiner

*Primary Examiner*—W. B. Perkey
(74) *Attorney, Agent, or Firm*—Greenblum & Bernstein, P.L.C.

(57) ABSTRACT

A camera which includes a camera body includes a main body and a mirror box fixed to the main body. The mirror box and the main body are made of a first material having a first thermal expansion coefficient and a second material having a second thermal expansion coefficient, respectively, the second thermal expansion coefficient being smaller than the first thermal expansion coefficient. The mirror box is fixed to the main body by at least two fixing devices symmetrically disposed with respect to an optical axis.

13 Claims, 9 Drawing Sheets

CAMERA BODY

BACKGROUND OF THE INVENTION

1. Field of the Invention

The present invention relates to a camera in which a camera body thereof is composed of a main body and a mirror box fixed to the main body, and more specifically relates to such a camera in which the mirror box is made of a material having a relatively high thermal expansion coefficient.

2. Description of the Related Art

An SLR camera system in which a camera body is composed of a main body and a mirror box, which are molded independently of each other, is known in the art. In the camera body of this type of SLR camera system, the mirror box which accommodates a reflecting mirror such as a quick-return mirror or a pellicle mirror and is generally equipped with components such as a lens mount, a shutter charge mechanism and a viewfinder optical system, thus required to be formed in a complicated shape, is often die-cast in aluminum or made of a glass fiber reinforced plastic (GFRP). On the other hand, the main body is generally composed of metal plates such as stamped metal plates, so that the mirror box, which is made by joining these metal plates together, is integrated into the main body to constitute the camera body. With the camera body having such a two-piece structure, the mirror box, which is a complex-shaped portion of the camera body, can be easily made while the required strength of the camera body can be easily ensured by the main body.

In such a camera in which the camera body is composed of a combinations of parts made of different materials, the mirror box having a high thermal expansion coefficient (especially the mirror box which is die-cast in aluminum or made of a glass fiber reinforced plastic) is distorted by a variation in ambient temperature by a greater amount than the main body. Such thermal distortion occurs unevenly because the mirror box is fixed to the main body only at a finite number of points to thereby cause a variation in amount of thermal distortion of the mirror box at different portions thereof, or because there is a difference in amount of thermal distortion between the portions of the mirror box which are different in direction of resin flow at the process of molding the mirror box in the case where the mirror box is molded of resin. If such a difference in amount of thermal distortion occurs, high-quality images (tightly focused images) cannot be obtained due to such reasons as the mounting surface of the lens mount on the camera body to which a photographing lens is detachably attached becoming nonparallel to a focal plane (a film surface or an imaging surface of an image pick-up device), the axial position of the focal plane (or back focal distance) varying, an image formed on a picture plane partly becoming out-of-focus, and defocusing occurring in the entire area of the picture plane.

Specifically, in a digital camera such as disclosed in Japanese Unexamined Patent Publication No.2003-69886 in which the imaging surface of the image pick-up device such as a CCD image sensor lies in a focal plane, on which an object image is formed through the photographing lens, the mirror box is easily distorted by heat produced by the image pick-up device when the image pick-up device operates. Moreover, in such a digital camera, the positioning accuracy required for the imaging surface of the image pick-up device is so rigorous that requirements for focusing on the image pick-up device cannot be satisfied by merely controlling the amount of thermal distortion by a certain degree, which makes it difficult to obtain high-quality images.

To minimize such thermal distortion, one option would be to make the mirror box out of a material having a low thermal expansion coefficient. However, it is difficult to obtain a material of which a component having a complicated shape such as a mirror box can be easily molded as a light-weight component, and which has a low thermal expansion coefficient.

SUMMARY OF THE INVENTION

The present invention provides a camera which incorporates a camera body making it possible to minimize thermal distortion of the mirror box to thereby make a high-quality picture taking possible.

According to an aspect of the present invention, a camera which includes a camera body is provided, including a main body and a mirror box fixed to the main body. The mirror box and the main body are made of a first material having a first thermal expansion coefficient and a second material having a second thermal expansion coefficient, respectively, the second thermal expansion coefficient being smaller than the first thermal expansion coefficient. The mirror box is fixed to the main body by at least two fixing devices symmetrically disposed with respect to an optical axis.

The first material can be aluminum or resin.

It is desirable for the resin to be a glass fiber reinforced plastic.

It is desirable for the fixing devices to include eight fixing devices. The mirror box has a substantially rectangular box shape, and is fixed to the main body by the eight fixing devices disposed at eight corners of the mirror box, respectively.

It is desirable for the eight fixing devices to be provided as four pairs of fixing devices which are symmetrically disposed with reference to the optical axis. A first distance between a first pair among the four pairs of fixing devices, a second distance between a second pair among the four pairs of fixing devices, a third distance between a third pair among the four pairs of fixing devices, and a fourth distance between a fourth pair among the four pairs of fixing devices are substantially the same.

It is desirable for the first thermal expansion coefficient of the mirror box to be in the range of 2.3 through 6.6 ($\times 10E{-}5$/Celsius). The second thermal expansion coefficient of the main body is in the range of 1.04 through 1.6 ($\times 10E{-}5$/Celsius).

The main body can be made of a ferrous metal or of stainless steel.

It is desirable for the main body to include a back member, a bottom member, a left-side member and a right-side member. The bottom member is elongated in a lateral direction of the back member along a bottom edge of the back member. The left-side member and the right-side member are joined to a left portion and a right portion of the back member, respectively. The mirror box is accommodated in a space between the back member and the bottom member and between the left-side member and the right-side member. The mirror box is fixed to the back member, the bottom member, the left-side member and the right-side member by at least four fixing devices, respectively.

It is desirable for four corners of the mirror box on a back side thereof to be fixed to the back member, two lower front corners of the mirror box on a lower side thereof are fixed to the bottom member, and two upper front corners of the mirror box on an upper side thereof are fixed to the left-side member and the right-side member, respectively.

It is desirable for the camera to be constructed as a digital camera in which the camera body is equipped with an image sensor package including an image sensor.

The mirror box cam includes a lens mount at a front end of the mirror box.

It is desirable for the image sensor package to be fixed to the back member to be positioned immediately behind a rectangular aperture formed on the back member.

According to another aspect of the present invention, a camera having a main body and a mirror box which serve as elements of a camera body is provided, wherein the mirror box is fixed to the main body at eight corners of the mirror box, and the mirror box and the main body are made of a first material having a first thermal expansion coefficient and a second material having a second thermal expansion coefficient, respectively, the second thermal expansion coefficient being smaller than the first thermal expansion coefficient.

The camera can be a digital camera including an image pick-up device.

The present disclosure relates to subject matter contained in Japanese Patent Applications No.2003-281569 (filed on Jul. 29, 2003) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
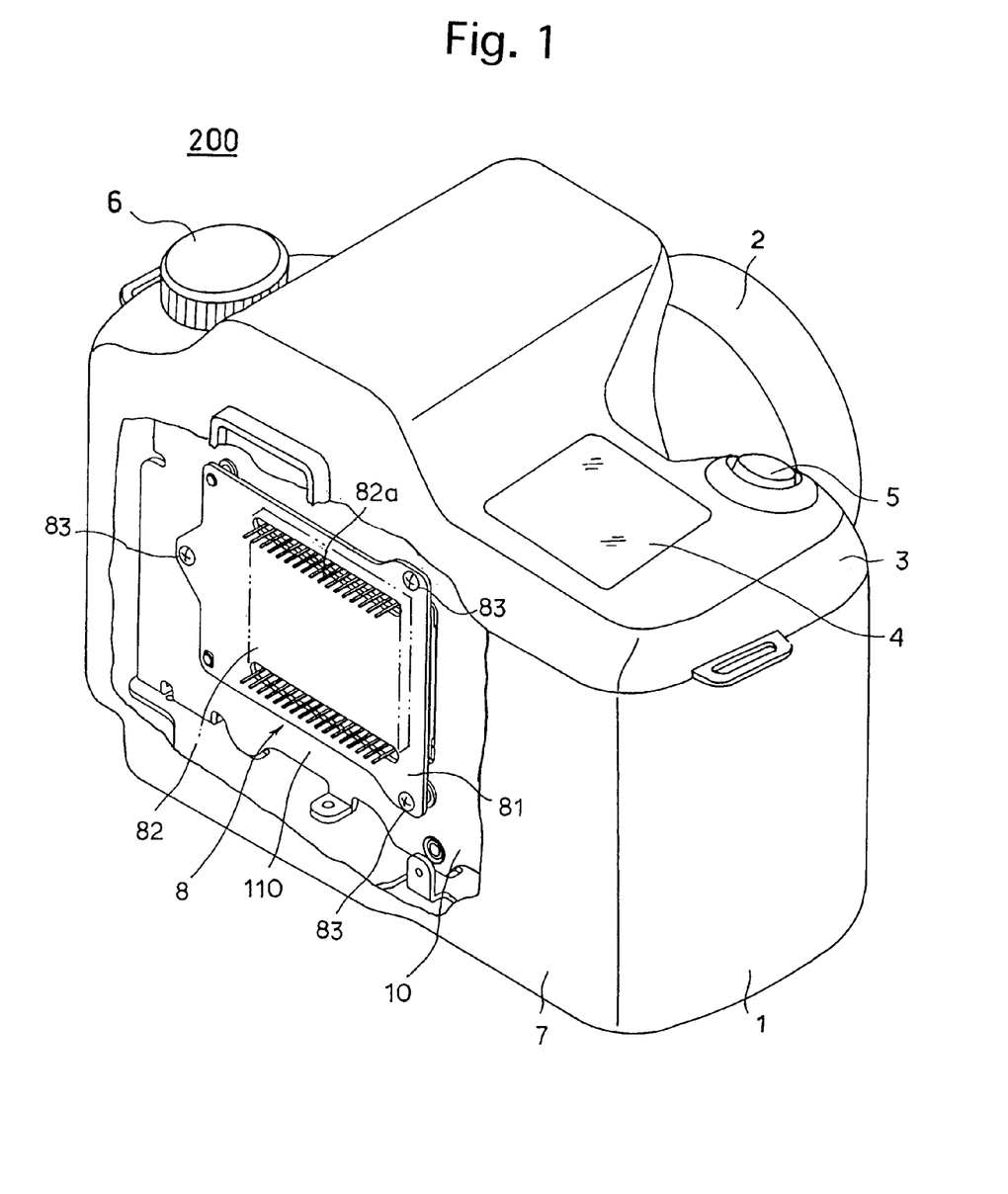
FIG. 1 is a perspective view, with a portion broken away for clarity, of a first embodiment of a digital camera according to the present invention, viewed obliquely from behind the digital camera.

FIG. 1 shows a first embodiment of a digital camera according to the present invention. The digital camera 200 that is constructed as an SLR digital camera is provided with an interchangeable photographing lens 2 which is detachably attached to the front of a camera body 1. The digital camera 200 is provided on a top cover 3 of the camera body 1 with an LCD indicating portion 4, a release button 5 and a select dial (dial switch) 6. The digital camera 200 is provided on a back cover 7, a portion of which is broken away for clarity in FIG. 1, with an LCD monitor and various switches (all of which are not shown in FIG. 1). The digital camera 200 is provided therein inside the back cover 7 (i.e., inside the camera body 1) with a CCD unit (image sensor unit) 8 including a large CCD image sensor (CCD chip). The CCD unit 8 is fixed to a main body 10 positioned inside the camera body 1 in an internal space thereof behind a mirror box 11 (not shown in FIG. 1) provided in the camera body 1, so that an imaging surface of the CCD chip included in the CCD unit 8 lies in a focal plane on which an object image is formed through the photographing lens 2.

Figure 2:
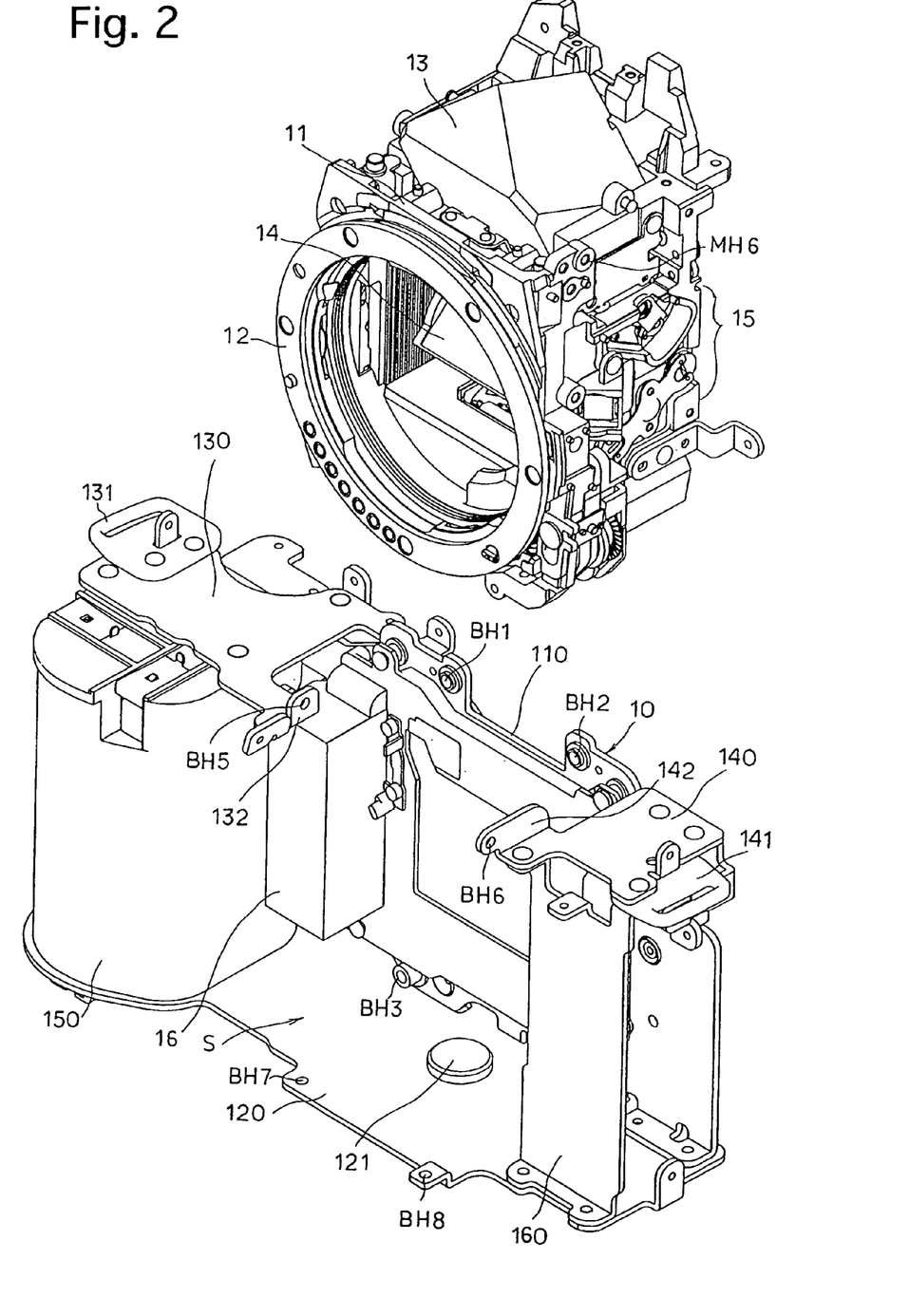
FIG. 2 is an exploded perspective view of a main body and a mirror box which are elements of a camera body of the digital camera shown in FIG. 1.

FIG. 2 is an exploded perspective view of internal elements of the camera body 1 of the digital camera 200 shown in FIG. 1. As mentioned above, the camera body 1 is provided with the main body 10 and the mirror box 11. The mirror box 11 is die-cast in aluminum or made of a glass fiber reinforced plastic, and is formed into a rectangular box shape as a whole, specifically, a hollow prism shape like a substantially cubic shape. The mirror box 11 is provided at the front thereof with a lens mount ring (lens mount) 12 to which the photographing lens 2 is detachably attached. The lens mount ring 12 is integrally fixed to a front surface of the mirror box 11 by a fixing device such as set screws. A pentagonal prism 13 together with a focusing screen (not shown) is mounted on top of the mirror box 11, while a quick-return mirror 14 and other parts are installed in the mirror box 11. The lens mount ring 12 is fixed to the mirror box 11 so that the mounting surface (front surface) of the lens mount ring 12 lies in a plane orthogonal to the optical axis of the photographing lens 2. In addition, a mirror drive mechanism and other mechanical parts 15 are mounted to a side surface of the mirror box 11, while the mirror box 11 is provided, at eight corners thereof (not only corners but also portions in the vicinity of the corners), with eight threaded screw holes, respectively: first through eighth screw holes MH1 through MH8 for fixing the mirror box 11 to the main body 10. Among the first through eighth screw holes MH1 through MH8, only the sixth screw hole MH6 is shown in FIG. 2.

The main body 10 is composed of a back member 110, a bottom member 120, a top-left member (left-side member) 130 and a top-right member (right-side member) 140, each of which is made of a ferrous metal (e.g., stainless steel) having a thermal expansion coefficient lower than that of aluminum or a glass fiber reinforced plastic. The back member 110, the bottom member 120, the top-left member 130 and the top-right member (right-side member) 140 are joined together by set screws or swaging to be provided as an integral member. Specifically, the bottom member 120, which is elongated in a lateral direction of the back member 110 along a bottom edge thereof, is fixed to the back member 110, while each of the top-left member 130 and the top-right member 140 is fixed to the back member 110 to extend forward from the upper edge of the back member 110 in the form of a canopy. The mirror box 11 is accommodated in a space S between the back member 110 and the bottom member 120 and between the top-left member 130 and the top-right member 140.

In the present embodiment of the digital camera, the thermal expansion coefficient (linear expansion coefficient) of the aluminum of which the mirror box 11 is made is 2.3 (×10E-5/Celsius). The thermal expansion coefficient of the glass fiber reinforced plastic of which the mirror box 11 is made is 3.7 (×10E-5/Celsius) in a direction parallel to a direction of the plastic flow or 6.6 (×10E-5/Celsius) in a direction orthogonal to the direction of the plastic flow. The thermal expansion coefficient of the stainless steel (either SUS430 or SUS304) of which the main body 10 is made of is 1.04 (×10E-5/Celsius) or 1.6 (×10E-5/Celsius), respectively.

The back member 110 is formed in the shape of a substantially flat plate. The back member 110 is provided on a portion thereof fronting on the space S with a rectangular aperture (not shown) through which object light, which is passed through the photographing lens 2 mounted to the lens mount ring 12, is incident on the imaging surface of the CCD chip included in the CCD unit 8. A mechanical shutter unit 16 of the digital camera 200 is fixed to a front surface of the back member 110. In FIG. 2, the rectangular aperture of the back member 110 is not shown because the rectangular aperture is positioned behind the shutter unit 16. As shown in FIG. 1, the CCD unit 8 is fixed to a rear surface of the back plate 110 at a portion thereof facing the shutter unit 16. The CCD unit 8 is provided with a reference plate (base plate) 81 and a CCD package (image sensor package) 82 mounted to the reference plate 81. The reference plate 81 serves as a positional reference for a focal plane of the digital camera 200, while the CCD package 82 includes the CCD chip in a sealed fashion. The CCD unit 8 is fixed to the back member 110 at three points around the rectangular aperture of the reference plate 81 by three set screws 83, respectively. FIG. 1 shows a state where two external lead arrays 82a of the CCD package 82 project rearward from reference plate 81. The bottom member 120 and the back member 110 are joined together so that a major part of the bottom member 120 projects forward from the bottom end of the back member 110 (see FIGS. 2 and 5) to have an L-shaped cross section. The bottom member 120 is provided in a central portion thereof with a tripod socket (screw hole) 121. The digital camera 200 is provided, immediately below the top-left member 130 between the top-left member 130 and the bottom member 120, with a cylindrical battery chamber 150 which is made of resin, and is further provided, immediately below the top-right member 140 between the top-right member 140 and the bottom member 120, with a pillar member 160, so that some elements of the digital camera 200 can be accommodated in a space between the pillar member 160 and the back plate 110. A left strap lug 131 and a right strap lug 141 are formed integral with the top-left member 130 and the top-right member 140, respectively. The back member 110, the bottom member 120, the top-left member 130 and the top-right member 140 are provided with first through eight through holes BH1 through BH8 which are formed at positions corresponding to the positions of the first through eighth screw holes MH1 through MH8 of the mirror box 11, respectively. The top-left member 130 and the top-right member 140 are provided on respective inner edges thereof facing each other with a left fixing lug 132 and a right fixing lug 142, respectively, each of which projects upwards. The fifth through hole BH5 and the sixth through hole BH6 are formed on the left fixing lug 132 and the right fixing lug 142, respectively. Note that the fourth through hole BH4 is not shown in FIG. 2.

The first through eight through holes BH1 through BH8 of the mirror box 11, which are formed at positions respectively corresponding to the positions of the first through eighth screw holes MH1 through MH8 of the mirror box 11, are provided as four pairs of through holes; namely, the first through hole BH1 and the fifth through hole BH5 serves a first pair of through holes, the second through hole BH2 and the sixth through hole BH6 serves a second pair of through holes, the third through hole BH3 and the seventh through hole BH7 serves a third pair of through holes, and the fourth through hole BH4 and the eighth through hole BH8 serves a fourth pair of screw holes. The axes of the first through eight through holes BH1 through BH8 extend in a forward/rearward direction of the digital camera 200, i.e., in the direction of the optical axis of the photographing lens 2 (hereinafter refereed to simply as the optical axis direction). The first through fourth pairs of through holes are disposed longitudinally and bilaterally substantially symmetrical with reference to the optical axis of the photographing lens 2. Additionally, the distance between the first pair of through holes, the distance between the second pair of through holes, the distance between the third pair of through holes and the distance between the fourth pair of through holes in the optical axis direction are substantially the same.

Figure 3:
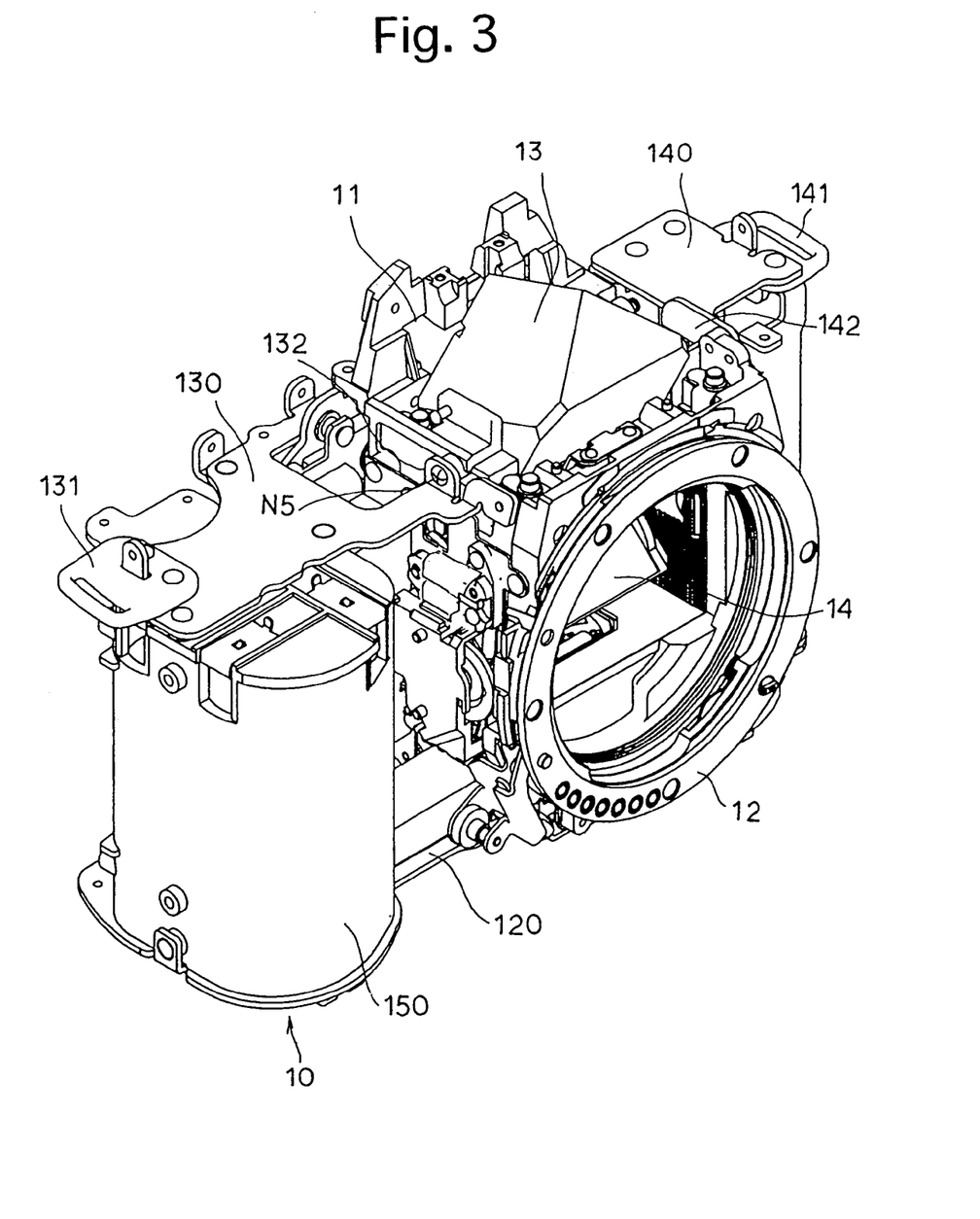
FIG. 3 is a perspective view of the main body and the mirror box which are shown in FIG. 2 in a state where the mirror box is fixed to the main body, viewed from front upper left of the digital camera.
Figure 4:
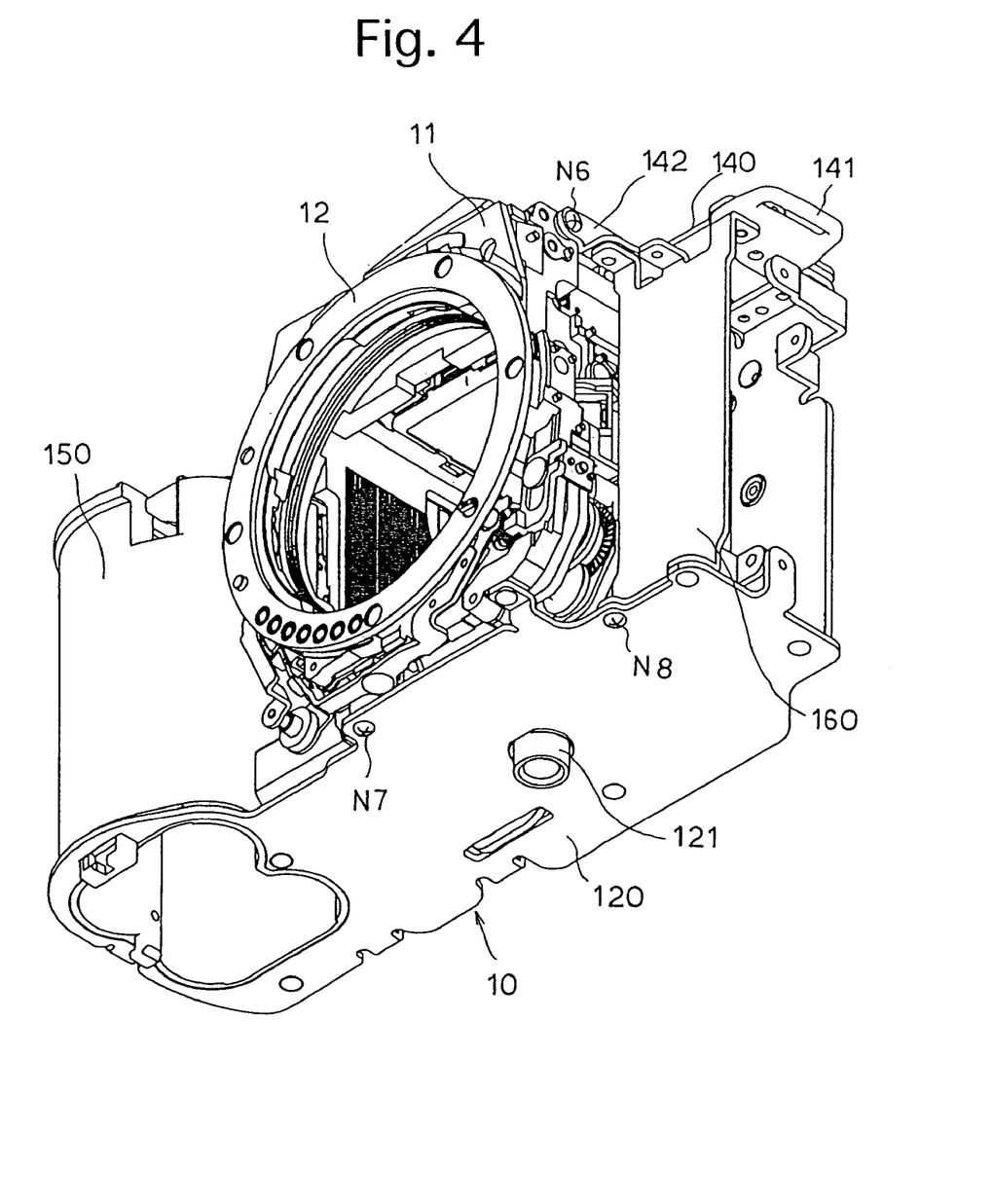
FIG. 4 is a perspective view of the main body and the mirror box which are shown in FIG. 3, viewed from front lower right of the digital camera.
Figure 5:
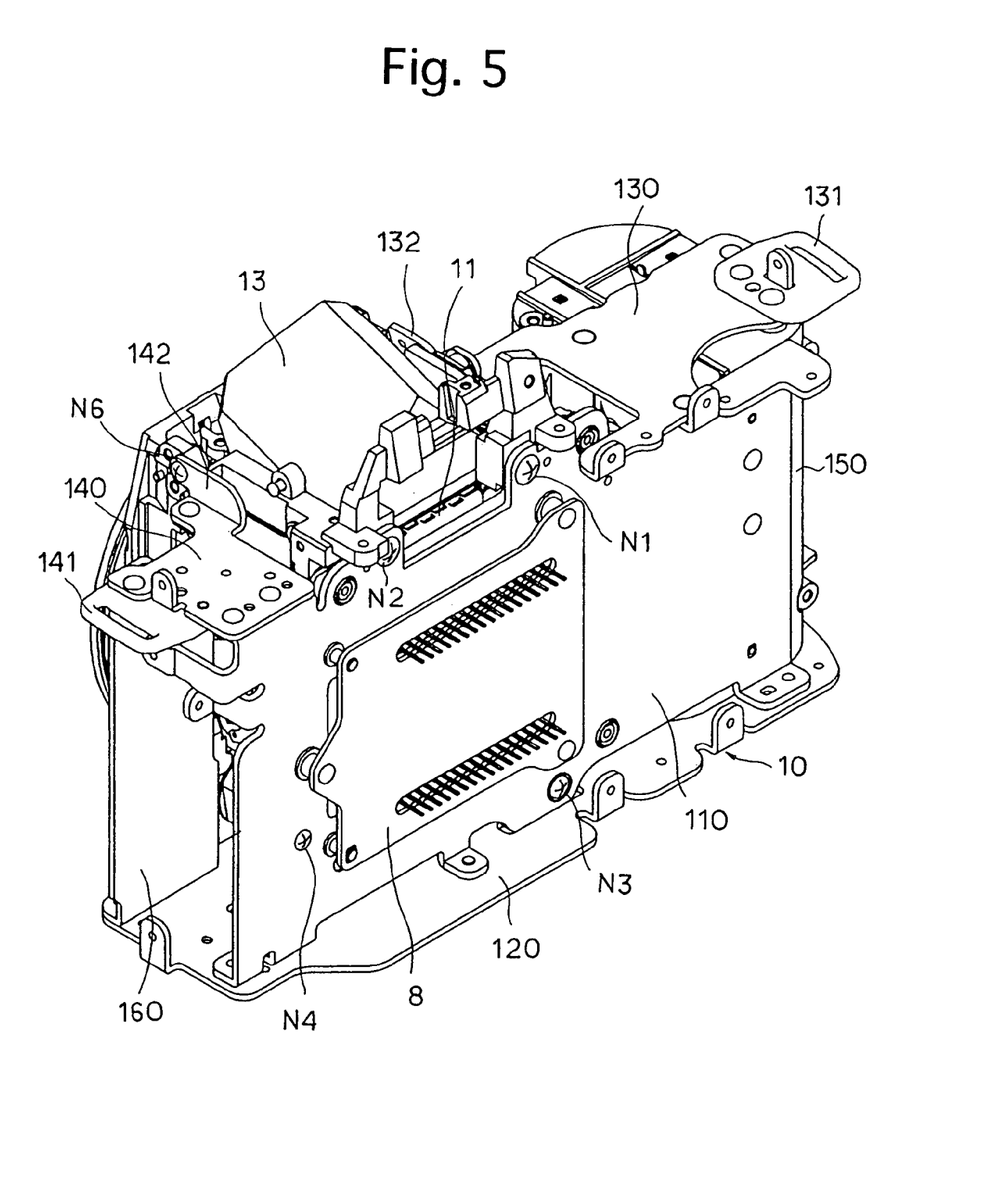
FIG. 5 is a perspective view of the main body and the mirror box which are shown in FIG. 3 in a state where a CCD unit including a CCD image sensor is fixed to the main body, viewed from rear upper right of the digital camera.
Figure 6:
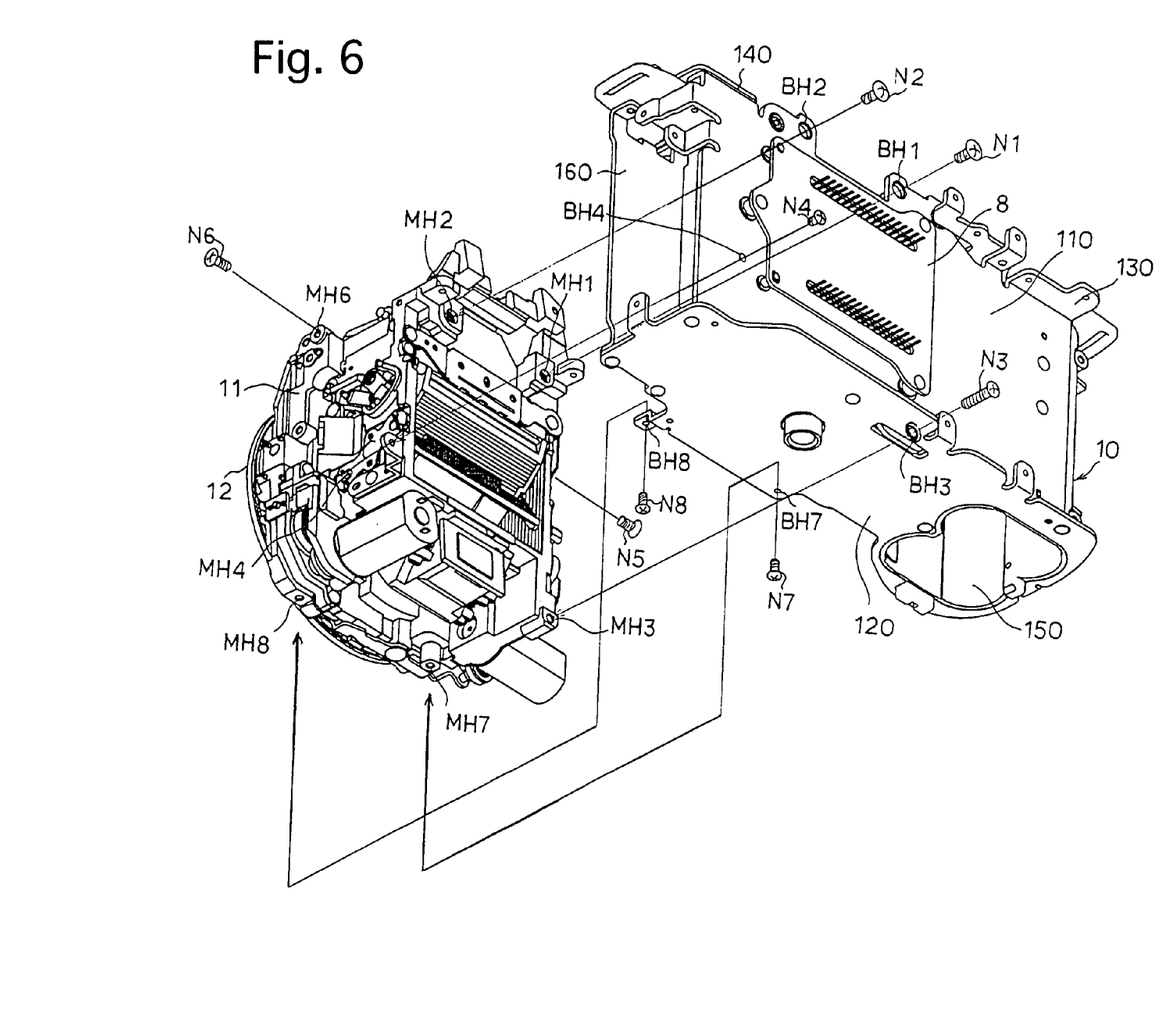
FIG. 6 is an exploded perspective view of the main body and the mirror box shown in FIG. 5, illustrating the fixing positions of set screws for fixing the mirror box to the main body, viewed from rear lower right of the digital camera.

The mirror box 11 is fixed to the main body 10 by eight set screws, i.e., first through eighth set screws N1 through N8, after being accommodated in the space S between the top-left member 130 and the top-right member 140, which are formed on the main body 10. FIG. 3 is a perspective view of the main body 10 and the mirror box 11 in a state where the mirror box 11 is fixed to the main body 10, viewed from front upper left of the digital camera 200, FIG. 4 is a perspective view of the main body 10 and the mirror box 11, viewed from front lower right of the digital camera 200, and FIG. 5 is a perspective view of the main body 10 and the mirror box 11, viewed from rear upper right of the digital camera 200. FIG. 6 is an exploded perspective view of the main body 10 and the mirror box 11, viewed from rear lower right of the digital camera, and illustrating the fixing positions of the first through eighth set screws N1 through N8. As shown in FIG. 6, the first through fourth set screws N1, N2, N3 and N4 are screwed into the first through fourth screw holes MH1, MH2, MH3 and MH4 (which are formed on the back of the mirror box 11 at the upper rear-left corner, the upper rear-right corner portion, the lower rear-left corner and the lower rear-right corner of the mirror box 11, respectively) from behind the mirror box 11 through the first through fourth through holes BH1 through BH4, respectively, to fix the mirror box 11 to the main body 10. The seventh set screw N7 and the eighth set screw N8 are screwed into the seventh screw hole MH7 and the eighth screw hole MH8 (which are formed on the bottom front of the mirror box 11 at the lower front-left corner and the lower front-right corner of the mirror box 11, respectively) from below the mirror box 11 through the seventh through hole BH7 and the eighth through hole BH8, respectively, to fix the mirror box 11 to the main body 10. The fifth set screw N5 and the sixth set screw N6 are screwed into the fifth screw hole MH5 and the sixth screw hole MH6 (which are formed on the left side and the right side of the mirror box 11 at the upper front-left corer and the upper front-right corner of the mirror box 11, respectively) from left and right of the mirror box 11 through the fifth through hole BH5 and the sixth through hole BH6, respectively, to fix the mirror box 11 to the main body 10.

In the camera body 1 that is constructed in the above described manner, the mirror box 11, which is made of aluminum (aluminum die-casting) or glass fiber reinforced plastic that has a relatively high thermal expansion coefficient, is mechanically fixed to the main body 10, which is made of stainless steel adopted as a ferrous metal having a relatively low thermal expansion coefficient, at all eight corners of the mirror box 11 in such a manner as to be surrounded by the main body 10. Therefore, even if the mirror box 11 is thermally distorted (e.g., expanded, shrunk or twisted) by a variation in ambient temperature, such a thermal distortion of the mirror box 11 is limited to a minimum since the mirror box 11 is firmly fixed to the main body 10 at all eight corners of the mirror box 11 by the first through eighth set screws N1 through N8. Namely, since the mirror box 11 is fixed to the main body 10 to be integral therewith, the mirror box 11 is not distorted by heat independently of the main body 10; the range of thermal distortion of the mirror box 11 remains within the range of a slight thermal distortion of the main body 10. This minimizes a variation of the distance between imaging surface of the CCD chip included in the CCD package 82 and the mounting surface of the lens mount ring 12 in the optical axis direction, makes the amount of defocus caused by a thermal distortion of the camera body 1 remain within a depth of field of the photographing lens 2, and prevents defocusing from occurring to ensure high-quality images.

In addition, even if the mirror box 11 together with the main body 10 is integrally distorted by a thermal distortion of the main body 10, the mounting surface of the lens mount ring 12 that is fixed to the front of the mirror box 11 remains orthogonal to the optical axis of the photographing lens 2, thus remaining parallel to the imaging surface of the CCD chip. This reason will be hereinafter discussed with reference to FIGS. 7A and 7B.

Figure 7A:
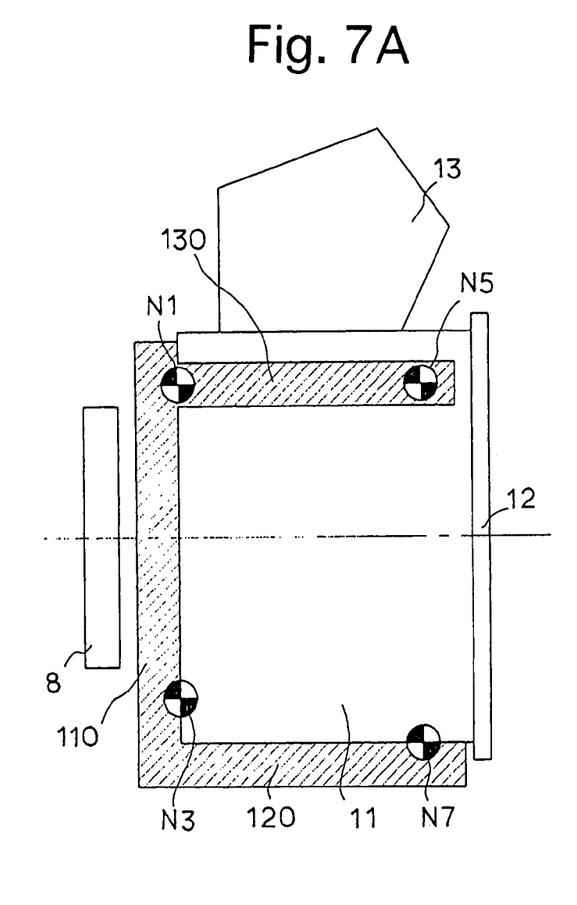
FIG. 7A is a schematic side elevational view of elements of the first embodiment of the digital camera, illustrating effects thereof.
Figure 7B:
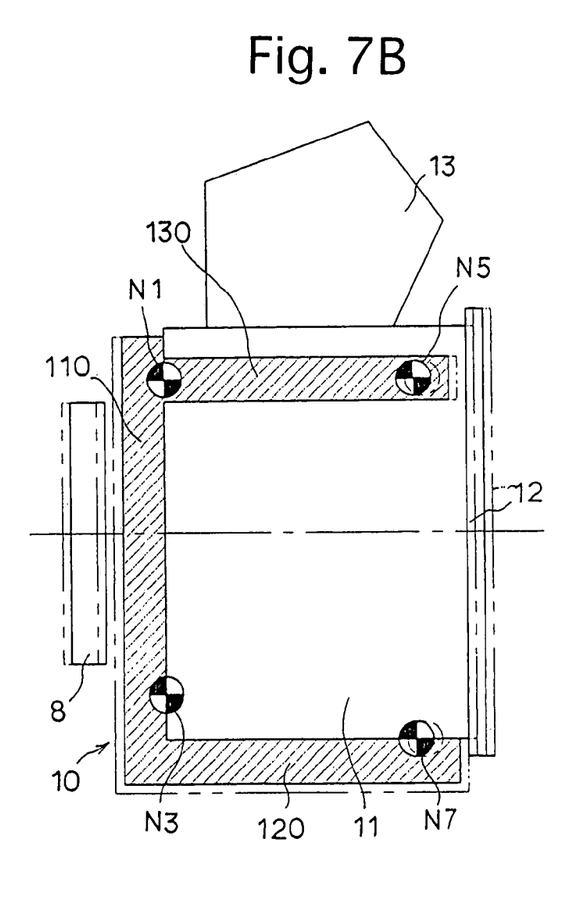
FIG. 7B is a view similar to that of FIG. 7A, illustrating effects of the first embodiment of the digital camera.

As shown in FIG. 7A which schematically shows the left side of the mirror box 11 in a fixed state thereof, the mirror box 11 is fixed to the back member 110, the bottom member 120 and the top-left member 130 by the first set screw N1, the third set screw N3, the fifth set screw N5 and the seventh set screw N7. Moreover, the fixing positions of the first set screw N1, the third set screw N3, the fifth set screw N5 and the seventh set screw N7 are positioned to be longitudinally and bilaterally substantially symmetrical with reference to the optical axis of the photographing lens 2. Additionally, the distance between the first set screw N1 and the fifth set screw N5 and the distance between the third set screw N3 and the seventh set screw N7 are substantially to the same as each other. Therefore, even if thermal distortion occurs in the main body 10 in such a manner as shown by two-dot chain lines in FIG. 7B, the amount of thermal distortion of the bottom member 120 and the amount of thermal distortion of the top-left member 130 in the optical axis direction are the same. This is true for the right side of the mirror box 11 in a fixed state thereof. With this structure, the lens mount ring 12 would be slightly shifted forward in the optical axis direction with the mounting surface thereof remaining orthogonal to the optical axis of the photographing lens 2 even if a thermal distortion occurs in the main body 10. Consequently, defocusing in a portion of the picture plane is prevented from occurring.

Figure 8A:
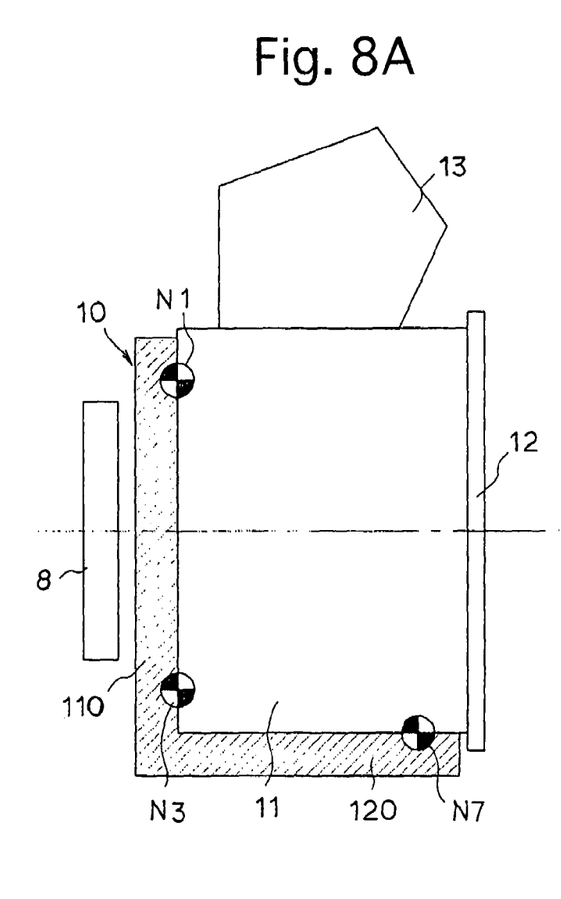
FIG. 8A is a schematic side elevational view of elements of a conventional camera, illustrating problems which reside in a conventional camera body.
Figure 8B:
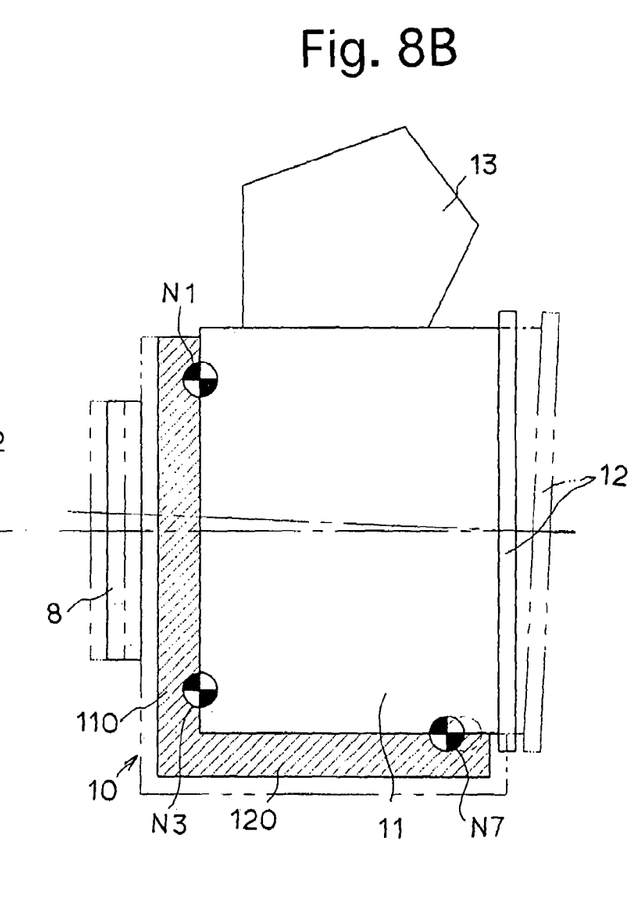
FIG. 8B is a view similar to that of FIG. 8A, illustrating problems which reside in the conventional camera body shown in FIG. 8A.

FIGS. 8A and 8B schematically show the left side of the mirror box 11 in a fixed state thereof in a convention camera body, where the mirror box 11 is fixed to the main body 10 without the use of the fifth set screw N5, which is screwed into the fifth screw hole MH5 of the mirror box 11 through the fifth through hole BH5 of the top-left member 130 of the first embodiment. In this case, an upper portion of the mirror box 11 adjacent to the top-left member 130 is not restrained from being distorted by heat even though a lower portion of the mirror box 11 below the top-left member 130 is restrained from being distorted by heat, and accordingly the upper portion of the mirror box 11 would be expanded by heat in the optical axis direction. Consequently, an upper portion of the lens mount ring 12 is distorted to cause the mounting surface of the lens mount ring 12 to tilt down as shown in FIG. 8B. This makes it impossible for the mounting surface of the lens mount ring 12 and the imaging surface of the CCD chip to remain parallel to each other, thus causing an occurrence of defocusing in a portion of the picture plane.

Although the main body 10 is provided with the top-left member 130 and the top-right member 140 so that the mirror box 11 is fixed to the main body 10 via the top-left member 130 and the top-right member 140 in the first embodiment of the digital camera, it is possible to restrain the mirror box 11 from being distorted by heat in the optical axis direction and to restrain the lens mount ring 12 from tilting with respect to the optical axis of the photographing lens 2 by only fixing the mirror box 11 to the main body 10 to be symmetrical with respect to the optical axis of the photographing lens 2. Therefore, the mirror box 11 does not necessarily need to be fixed to the main body 10 at all eight corners of the mirror box 11 if the mirror box 11 can be fixed to the main body 10 to be symmetrical with respect to the optical axis of the photographing lens 2. For instance, if a main body corresponding to the main body 10 is provided with a pair of side members (a right-side member and a left-side member) respectively positioned on the right side and the left side of the mirror box 11, and further if a right side wall and a left side wall of the mirror box 11 are respectively fixed to the pair of side members of the main body with the back of the mirror box 11 contacting with the back member 110 of the main body 10 to fix the mirror box 11 to the main body 11, the mirror box 11 can be fixed to the main body simply by two set screws which are screwed into the right side wall and the left side wall of the mirror box 11 through the pair of side members of the main body, respectively.

[Second Embodiment]

Figure 9A:
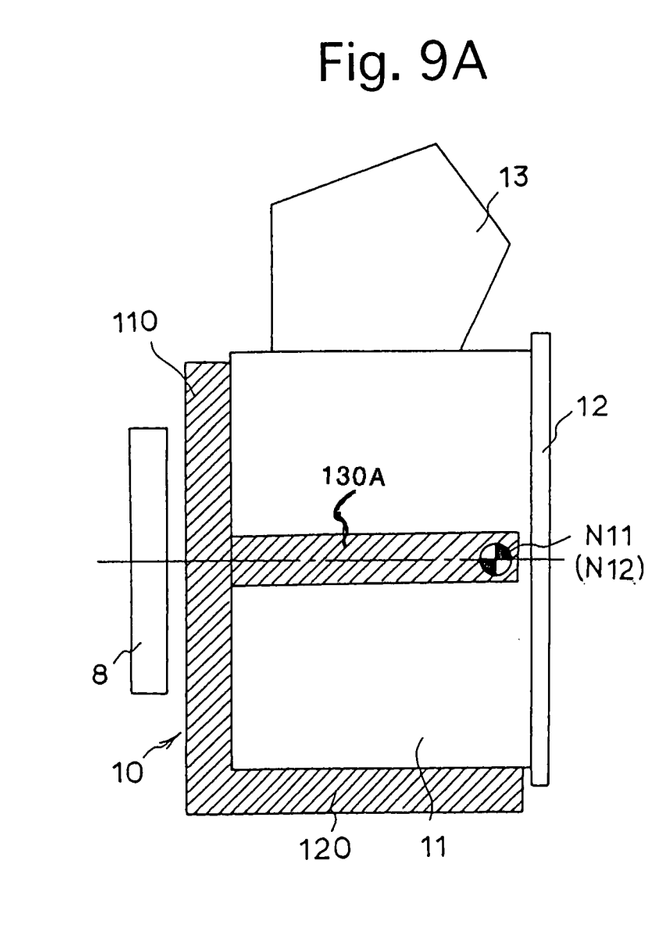
FIG. 9A is a schematic side elevational view of elements of a second embodiment of the camera, illustrating effects thereof.
Figure 9B:
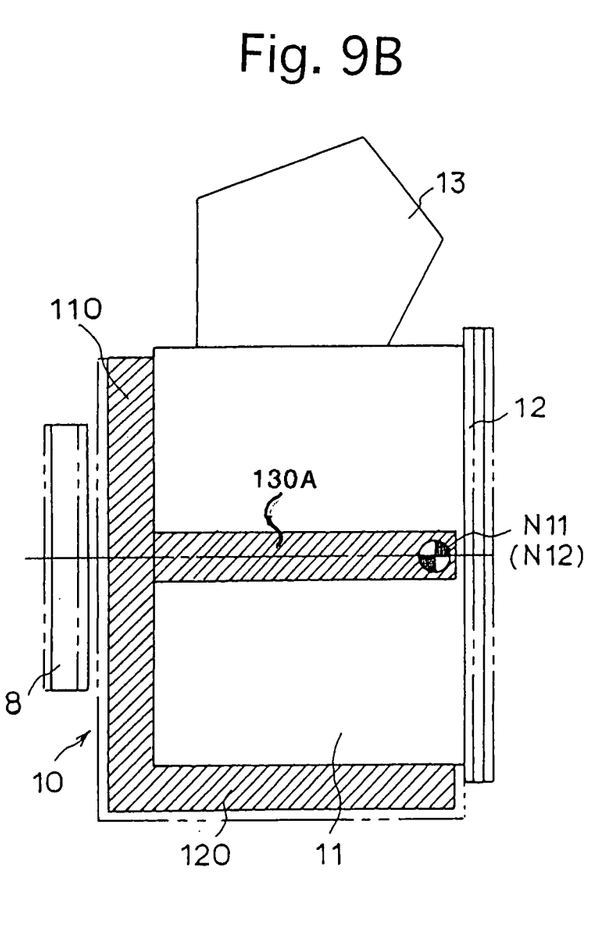
FIG. 9B is a view similar to that of FIG. 9A, illustrating effects of the second embodiment of the digital camera.

FIGS. 9A and 9B schematically show the left side of the mirror box 11 in a second embodiment of the camera body (main body 10 and mirror box 11) of the digital camera according to the present invention. In this embodiment, a main body corresponding to the main body 10 is provided with a left-side cantilever 130A which projects forward in the optical axis direction from the back member 110 of the main body. The left-side cantilever 130A is fixed to the mirror box 11 by a left set screw N11 in the vicinity of the front end of the left-side cantilever 130A at a portion thereof whose vertical position is identical to the vertical position of the optical axis of the photographing lens 2. Likewise, the main body is provided with a right-side cantilever (not shown) which projects forward in the optical axis direction from the back member 110 of the main body, and the right-side cantilever is fixed to the mirror box 11 by a right set screw N12 in the vicinity of the front end of the right-side cantilever at a portion thereof whose vertical position is identical to the vertical position of the optical axis of the photographing lens 2. Note that the right set screw N12 is positioned behind the left set screw N11 as viewed in FIG. 9A, thus not appearing in FIG. 9A. Accordingly, even if the mirror box 11 is fixed to the main body simply at two points in such a manner, a distortion of the mirror box 11 can be prevented, by the main body 10, from occurring in the optical axis direction, and at the same time, the lens mount 12 can be prevented from tilting since the left set screw N11 and the right set screw N12 are disposed to be symmetrical with respect to the optical axis of the photographing lens 2.

The present invention can be applied not only to a digital camera like the above described digital cameras, but also to a camera using silver-salt film in which film is disposed across a rectangular aperture formed on a back member of a mirror box (which corresponds to the aforementioned rectangular aperture of the back member 110).

According to the present invention, the arrangement in which the mirror box is fixed to the main body having a low thermal expansion coefficient at positions symmetrical with respect to the optical axis makes it possible for the mirror box be mechanically held by the main body, for defocusing to be prevented from occurring in the entire area of the picture plane by minimizing the thermal distortion of the mirror box, and at the same time, and for the imaging surface to be maintained parallel to the mounting surface of the lens mount on the camera body to prevent defocusing in a portion of the picture plane from occurring. Specifically if the mirror box is formed in a typical rectangular box shape, defocusing can be prevented from occurring in either the entire area of the picture plane or a portion of the picture area to ensure high-quality images by fixing the mirror box to the main body at all eight corner of the mirror box even if the mirror box is distorted by heat.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera which includes a camera body comprising a main body and a mirror box fixed to said main body,
    wherein said mirror box and said main body are made of a first material having a first thermal expansion coefficient and a second material having a second thermal expansion coefficient, respectively, said second thermal expansion coefficient being smaller than said first thermal expansion coefficient, and
    wherein said mirror box is fixed to said main body by at least two fixing devices symmetrically disposed with respect to an optical axis, and
    wherein said first material from which said mirror box is made is one of aluminum and resin, and said second material from which said camera body is made is a ferrous metal.

2. The camera according to claim 1, wherein said resin comprises a glass fiber reinforced plastic.

3. A camera which includes a camera body comprising a main body and a mirror box fixed to said main body,
    wherein said mirror box and said main body are made of a first material having a first thermal expansion coefficient and a second material having a second thermal expansion coefficient, respectively, said second thermal expansion coefficient being smaller than said first thermal expansion coefficient,
    wherein said mirror box is fixed to said main body by eight fixing devices symmetrically disposed with respect to an optical axis, and
    wherein said mirror box has a substantially rectangular box shape, and is fixed to said main body by said eight fixing devices disposed at eight corners of said mirror box, respectively.

4. The camera according to claim 3, wherein said eight fixing devices are provided as four pairs of fixing devices which are symmetrically disposed with reference to said optical axis, and
    wherein a first distance between a first pair among said four pairs of fixing devices, a second distance between a second pair among said four pairs of fixing devices, a third distance between a third pair among said four pairs of fixing devices, and a fourth distance between a fourth pair among said four pairs of fixing devices are substantially the same.

5. The camera according to claim 1, wherein said first thermal expansion coefficient of said mirror box is in the range of 2.3 through 6.6 (×10E-5/Celsius), and
    wherein said second thermal expansion coefficient of said main body is in the range of 1.04 through 1.6 (×10E-5/Celsius).

6. The camera according to claim 1, wherein said main body is made of stainless steel.

7. The camera according to claim 1, wherein said main body comprises a back member, a bottom member, a left-side member and a right-side member,
    wherein said bottom member is elongated in a lateral direction of said back member along a bottom edge of said back member,
    wherein said left-side member and said right-side member are joined to a left portion and a right portion of said back member, respectively,
    wherein said mirror box is accommodated in a space between said back member and said bottom member and between said left-side member and said right-side member, and
    wherein said mirror box is fixed to said back member, said bottom member, said left-side member and said right-side member by at least four fixing devices, respectively.

8. The camera according to claim 7, wherein four corners of said mirror box on a back side thereof are fixed to said back member,
    wherein two lower front corners of said mirror box on a lower side thereof are fixed to said bottom member, and
    wherein two upper front corners of said mirror box on an upper side thereof are fixed to said left-side member and said right-side member, respectively.

9. The camera according to claim 1, wherein said camera is constructed as a digital camera in which said camera body is equipped with an image sensor package including an image sensor.

10. The camera body according to claim 1, wherein said mirror box comprises a lens mount at a front end of said mirror box.

11. The camera body according to claim 9, wherein said image sensor package is fixed to said back member to be positioned immediately behind a rectangular aperture formed on said back member.

12. A camera having a main body and a mirror box which serve as elements of a camera body,
    wherein said mirror box is fixed to said main body at eight corners of said mirror box,
    wherein said mirror box and said main body are made of a first material having a first thermal expansion coefficient and a second material having a second thermal expansion coefficient, respectively, said second thermal expansion coefficient being smaller than said first thermal expansion coefficient, and
    wherein said first material from which said mirror box is made is one of aluminum and resin, and said second material from which said camera body is made is a ferrous metal.

13. The camera according to claim 12, wherein said camera is a digital camera including an image pick-up device.

* * * * *